United States Patent
Cong et al.

(10) Patent No.: US 8,994,991 B2
(45) Date of Patent: Mar. 31, 2015

(54) PRINTING CONTROL METHOD, PRINTER AND PRINTING SYSTEM

(75) Inventors: Qiangzi Cong, Shandong (CN); Chuntao Wang, Shandong (CN); Tianxin Jiang, Shandong (CN); Zhuanlong Yu, Shandong (CN); Jiabo Xu, Shandong (CN); Zhihua Han, Shandong (CN)

(73) Assignee: Shandong New Beiyang Information Technology Co., Ltd. (CN)

( * ) Notice: Subject to any disclaimer, the term of this patent is extended or adjusted under 35 U.S.C. 154(b) by 245 days.

(21) Appl. No.: 13/575,832

(22) PCT Filed: Nov. 12, 2010

(86) PCT No.: PCT/CN2010/078668
§ 371 (c)(1),
(2), (4) Date: Jul. 27, 2012

(87) PCT Pub. No.: WO2011/091679
PCT Pub. Date: Aug. 4, 2011

(65) Prior Publication Data
US 2012/0300258 A1    Nov. 29, 2012

(30) Foreign Application Priority Data

Jan. 29, 2010  (CN) .......................... 2010 1 0106158
Jul. 29, 2010  (CN) .......................... 2010 1 0239875

(51) Int. Cl.
*G06F 15/00* (2006.01)
*G06F 3/12* (2006.01)
(Continued)

(52) U.S. Cl.
CPC .............. *G06F 3/1284* (2013.01); *G06F 3/121* (2013.01); *G06F 3/1234* (2013.01); *G06F 3/1256* (2013.01); *G06F 3/1259* (2013.01);
(Continued)

(58) Field of Classification Search
CPC ..... G06F 3/121; G06F 3/1284; G06F 3/1234; G06F 3/1256; G06F 3/1259
USPC ................................ 358/1.15, 1.13, 1.14, 1.1
See application file for complete search history.

(56) References Cited

U.S. PATENT DOCUMENTS 4,293,236 A * 10/1981 Shimizu ...................... 400/593
5,099,290 A *  3/1992 Yokota ........................ 358/1.12
(Continued)

FOREIGN PATENT DOCUMENTS

CN        85105007 A      12/1986
CN        1329323 A        1/2002
(Continued)

OTHER PUBLICATIONS

International Search Report mailed Feb. 24, 2011 (with English Translation), 4 pages.
(Continued)

*Primary Examiner* — Douglas Tran
(74) *Attorney, Agent, or Firm* — Cantor Colburn LLP

(57) ABSTRACT

A printing control method, printer and printing system are provided. The printing control method comprises: receiving the ticket data to be printed; printing the ticket data; judging whether the printed ticket data is complete; and performing predetermined process according to the judgment result. The invention can conveniently and accurately judge whether a ticket is completely printed.

20 Claims, 7 Drawing Sheets

(51) Int. Cl.
  *G06K 1/00* (2006.01)
  *G07F 17/42* (2006.01)
  *G07B 1/00* (2006.01)
  *G07B 5/08* (2006.01)
(52) U.S. Cl.
  CPC ................ *G07F 17/42* (2013.01); *G07B 1/00* (2013.01); *G07B 5/08* (2013.01)
  USPC ........................................ 358/1.15; 358/1.14

(56) References Cited

U.S. PATENT DOCUMENTS

| | | | | |
|---|---|---|---|---|
| 5,110,226 | A * | 5/1992 | Sherman et al. | 400/88 |
| 2002/0113124 | A1 * | 8/2002 | Meyerhofer et al. | 235/454 |
| 2002/0181005 | A1 * | 12/2002 | Brooks et al. | 358/1.14 |
| 2005/0109810 | A1 | 5/2005 | Mkrtchyan | |
| 2006/0096482 | A1 | 5/2006 | Duke | |
| 2006/0176509 | A1 * | 8/2006 | Aoki et al. | 358/1.15 |
| 2007/0091346 | A1 * | 4/2007 | Ogura et al. | 358/1.14 |

FOREIGN PATENT DOCUMENTS

| | | |
|---|---|---|
| CN | 1818961 A | 8/2006 |
| CN | 101807140 A | 8/2010 |

OTHER PUBLICATIONS

European Search Report for corresponding application EP10844456; Report dated Sep. 5, 2014.

* cited by examiner

PRINTING CONTROL METHOD, PRINTER AND PRINTING SYSTEM

TECHNICAL FIELD OF THE INVENTION

The invention relates to a printing control method, printer and printing system.

BACKGROUND OF THE INVENTION

The ticket printer is widely applied to the fields of lottery, transportation, supermarket, shopping mall and so on, and is used for printing securities or transaction certificates, such as lottery ticket, passenger ticket and purchase invoice. These tickets can be used normally only when the ticket content is printed completely.

In related technologies, the host control software of printer cannot know whether the data that the ticket includes is completely printed, consequently, after sending the data of a ticket to be printed to the printer, the host control software considers the ticket is printed successfully, and considers the valid ticket is printed and registers the number of ticket in the software system of the host even the situation that the ticket is invalid, caused by the incomplete printing of the ticket content, happens. For example, during the process of printing ticket, although the data of the current ticket is lost, and the ticket content is incompletely printed, which is caused by the reasons that the upper cover of printer is lifted, the data communication is disturbed, the ticket printing paper is used up and it is needed to replace the sheet roll, and other reasons, the host control software also considers a complete valid ticket is printed. Thus, when the ticket data to be printed is not printed on the ticket completely and accurately because of malfunction of the printer, the ticket that the user purchases may not be used normally because of the incomplete contents of ticket, such as barcode, key number and amount of money, which seriously damages the property interest of ticket user and causes unnecessary dispute between the ticket user and the ticket publisher.

There is no effective solution provided at present for the problem that it is difficult to conveniently and accurately judge whether the ticket is completely printed in related technologies.

SUMMARY OF THE INVENTION

The invention is presented aiming at the problem that it is difficult to conveniently and accurately judge whether the ticket is completely printed in related technologies; therefore, the main purpose of the invention is providing a printing control method, printer and printing system, so as to solve the above problem.

For achieving the purpose, according to an aspect of the invention, a printing control method is provided.

The printing control method according to the invention comprises: receive the ticket data to be printed; print the ticket data; judge whether the printed ticket data is complete; and perform predetermined process according to the judgment result.

For achieving the purpose, according to another aspect of the invention, a printer is provided. The printer comprises: a first printing mechanism, which is used for printing the received ticket data; an extracting mechanism, which is used for extracting the printed ticket data; a control mechanism, which is used for judging whether the ticket data is completely printed according to the printed ticket data; and a processing mechanism, which is used for performing predetermined process according to the judgment result.

For achieving the purpose, according to another aspect of the invention, a printing system is provided. The printing system comprises: a host, which is used for sending the ticket data; and a printer, which is used for printing the received ticket data, and extracting the printed ticket data; the printer and/or the host are further used for judging whether the ticket data is completely printed according to the printed ticket data, wherein the printer is further used for performing predetermined process according to the judgement result.

Through the invention, the problem that it is difficult to conveniently and accurately judge whether the ticket is completely printed in related technologies is solved, thereby achieving the effect of judging conveniently and accurately whether the ticket is completely printed by the method that comprises: receiving the ticket data to be printed; printing the ticket data; judging whether the printed ticket data is complete; performing the first process under the condition that the ticket data is completely printed; and/or performing the second process under the condition that the ticket data is incompletely printed; the user can directly judge whether the ticket data is completely printed through the first process and/or the second process.

BRIEF DESCRIPTION OF THE DRAWINGS

The accompanying drawings described here are used for providing a further understanding of the invention, and constitute a part of the application; the schematic embodiments and specification thereof are used for illustrating the invention and not intended to form improper limitation to the invention. In the accompanying drawings.

DETAILED DESCRIPTION OF THE EMBODIMENTS

The present invention will be described hereinafter in detail with reference to the accompanying drawings and in conjunction with embodiments. It needs to note that the embodiments of the present application and the features in the embodiments can be combined with each other if there is no conflict.

Figure 1:
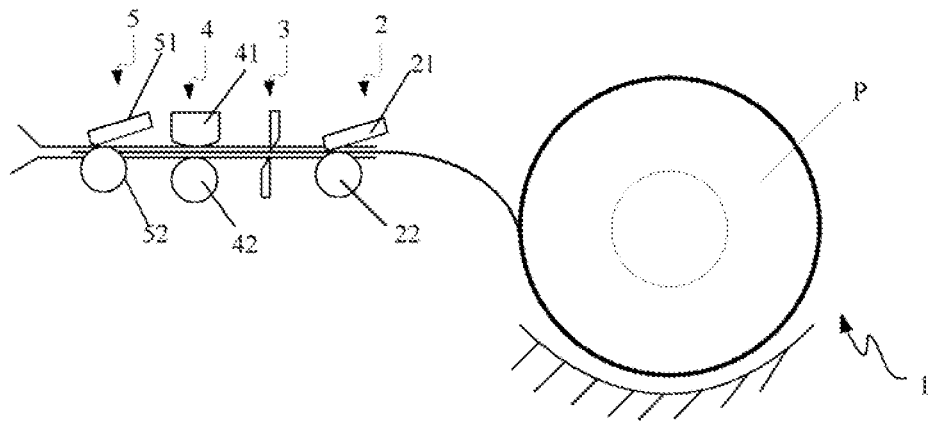
FIG. 1 shows a schematic diagram of a printer provided according to the first embodiment of the invention.

FIG. 1 shows a schematic diagram of a printer provided according to the first embodiment of the invention.

As shown in FIG. 1, the printer comprises a paper accommodating mechanism 1, a first printing mechanism 2, a cutter mechanism 3, a scanning mechanism 4 and a processing mechanism 5. Specifically, the paper accommodating mechanism 1 is used for accommodating roll paper P for printing; the printing mechanism 2 is at downstream part of the paper accommodating mechanism on a paper conveying passage, and is used for printing the ticket information on the printer paper P, wherein the printer paper printed with the ticket information is called ticket paper for short, for describing conveniently; the cutter mechanism 3 is at downstream part of the printing mechanism 2 on the paper conveying passage, and is used for cutting the printed ticket paper to separate it from the paper roll; the scanning mechanism 4 is at downstream part of the cutter mechanism 3 on the paper conveying passage, and is used for scanning image or text printed on the ticket paper; a controller (not shown in the figure) is used for judging whether the ticket data is completely printed on the ticket, for example, the printed ticket data can be compared with the received data to be printed; the processing mechanism 5 is connected with the control mechanism, and is used for performing predetermined process according to the judgment result. For example, valid mark representing that the ticket can be used normally is marked on the completely printed ticket paper, or the incompletely printed ticket paper is invalidated.

The first printing mechanism 2 is used for printing the ticket information on the printer paper P, wherein the ticket information comprises the set text, image and so on, thus the way that the first printing mechanism adopts to realize the printing function does not influence implementation of the invention, and the first printing mechanism 2 can be thermal printing mechanism, thermal transfer printing mechanism, dot-matrix printing mechanism, inkjet printing mechanism and so on. In the embodiment, the first printing mechanism 2 is the thermal printing mechanism, comprising the first printing head 21 and the first roller 22, wherein the first printing head 21 and the first roller 22 are in tangential contact, and the printer paper P passes between the first printing head 21 and the first roller 22. In printing, the first roller 22 is driven by the drive mechanism (not shown in the figure) of printer to drive paper to move towards the paper exit, at the same time, the first printing head 21 prints the ticket information on the printer paper P.

The scanning mechanism 4 comprises an image acquiring module 41 which is used for acquiring the medium image information. Preferably, the image acquiring module 41 is a Contact Image Sensor (CIS); of course, the image acquiring module 41 can also be other types of image acquiring modules capable of acquiring the medium image information, for example, the Charge Coupled Device (CCD) image sensor. When the image acquiring module 41 is the CIS, the scanning mechanism 3 further comprises a platen 42 which is set opposite to it. A scanning roller 42 is in close contact with the image acquiring module 41; the printed ticket paper passes between the platen 42 and the image acquiring module 41; the image acquiring module 41 can complete acquisition of the image on surface of the ticket paper.

The processing mechanism 5 comprises a first processing mechanism and/or a second processing mechanism.

The first processing mechanism can be a marking mechanism, which is used for marking the valid mark representing that the ticket can be used normally on the completely printed ticket paper; the first processing mechanism can also be a prompting mechanism, such as indicator light, buzzer and display, which is used for providing a prompt that the ticket is printed normally through light, sound or display information. The first processing mechanism can be printing mechanism, stamping or punching mechanism. In the embodiment, the first processing mechanism is the printing mechanism, hereafter called the second printing mechanism for differentiating it from the first printing mechanism 2. Likewise, the way that the second printing mechanism adopts to realize the printing function does not influence implementing of the invention; thus, the second printing mechanism can be thermal printing mechanism, thermal transfer printing mechanism, dot-matrix printing mechanism, inkjet printing mechanism and so on. In the embodiment, the second printing mechanism 2 is the thermal printing mechanism, comprising the second printing head 51 and the second roller 52, wherein the second printing head 51 and the second roller 52 are in tangential contact, and the ticket paper P passes between them. In printing, the second roller 52 is driven by the drive mechanism (not shown in the figure) of printer to drive paper to move towards the paper exit, at the same time, the second printing head 51 prints the valid mark on the ticket paper. The first processing mechanism can also comprise both the marking mechanism and the prompting mechanism, and prompts the operator that the ticket paper is printed normally through the prompting mechanism, while marking the valid mark representing that the ticket can be used normally on the completely printed ticket paper.

The second processing mechanism can be a marking mechanism, and is used for marking the invalid mark representing that the ticket cannot be used normally on the incompletely printed ticket paper; the processing mechanism can also be the prompting mechanism, such as indicator light, buzzer and display, which is used for providing a prompt that the ticket is printed abnormally through light, sound or display information, or can also be an invalid ticket recycling mechanism and the like used for recycling the printed invalid ticket. The first processing mechanism can also comprise the marking mechanism, the prompting mechanism and the recycling mechanism, and prompts the operator that the ticket paper is printed abnormally through the prompting mechanism and recycles the ticket paper to the recycling mechanism, while marking the invalid mark representing that the ticket cannot be used normally on the incompletely printed ticket paper.

It needs to note that the first processing mechanism and the second processing mechanism can be different mechanisms; for example, the first processing mechanism and the second processing mechanism are the mark printing mechanism for identifying the complete printing and the punching mechanism for identifying the invalid ticket, respectively; the first processing mechanism and the second processing mechanism can also be the same mechanism; for example, both of them are the same printing mechanism for printing different identities, or both of them are the same prompting mechanism for providing different prompts under different situations.

Figure 2:
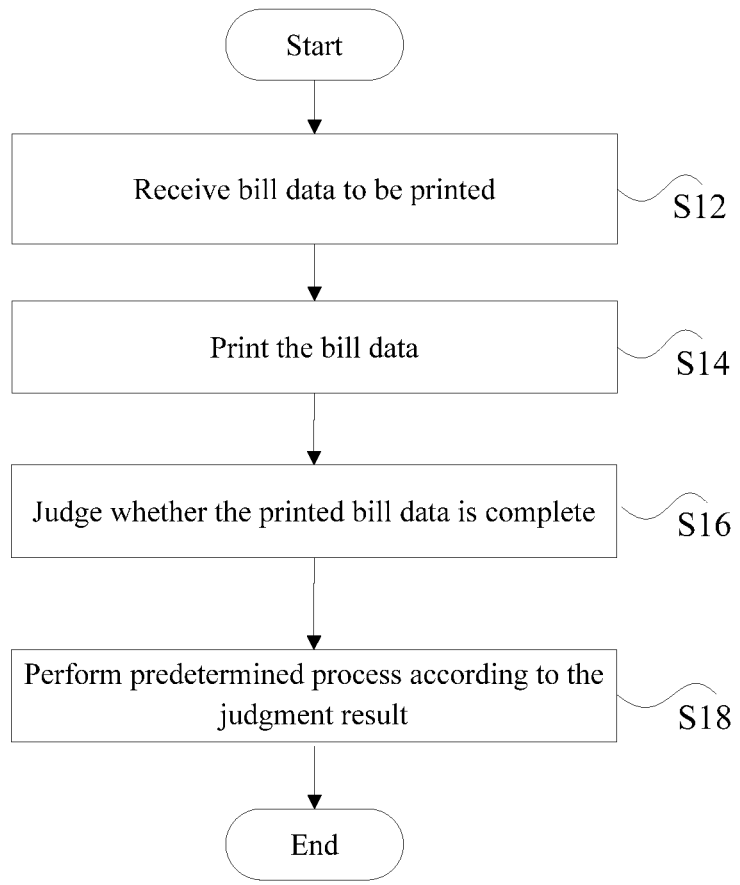
FIG. 2 shows a flowchart of a printing control method according to the first embodiment of the invention.

FIG. 2 shows a flowchart of a printing control method according to the first embodiment of the invention. As shown in FIG. 2, the method comprises the following steps:

Step S12: receive the ticket data to be printed; for example, the printer receives the ticket data from the host side.

Step S14: print the ticket data; for example, the first printing mechanism 2 in the printer prints the ticket data.

Step S16: judge whether the printed ticket data is complete; judging the completeness of the printed ticket data can either utilize the image of the printed ticket which scanned by the scanning mechanism 4 to judge, or utilize the photographed image of the printed ticket to judge; and, it can be various other judging methods.

Step S18: perform predetermined process according to the judgment result; in the step S18, performing predetermined process comprises: perform the first process under the condition that the ticket data is completely printed and/or perform the second process under the condition that the ticket data is incompletely printed.

For the first process, for example, it is marking the completely printed ticket under the condition that the ticket data is completely printed, wherein the process of marking can be either printing the valid mark on the completely printed ticket, or adopting the ways such as punching or stamping to mark.

For the second process, for example, it is marking the incompletely printed ticket under the condition that the ticket data is incompletely printed, wherein the process of marking can be either printing the invalid mark on the incompletely printed ticket, or adopting the ways such as punching or stamping to mark.

The first process and the second process can be the same process that the printer performs, for example, both of them are the mark printing process, but print different marks; or both of them are the prompting process, but provide different prompting signals; the first process and the second process can also be different processes that the printer performs, for example, the mark printing process is performed when printing is complete, and the punching process is performed when printing is incomplete.

It needs to note that for the first process and the second process, only one of them can be performed, or both of them are performed, that is because they can also be differentiated under the condition of performing process only to the completely printed ticket or only to the incompletely printed ticket. Correspondingly, the printer can only comprise the first processing mechanism which performs the first process or only comprise the second processing mechanism which performs the second process, and can also comprise both the first processing mechanism and the second processing mechanism.

Figure 3:
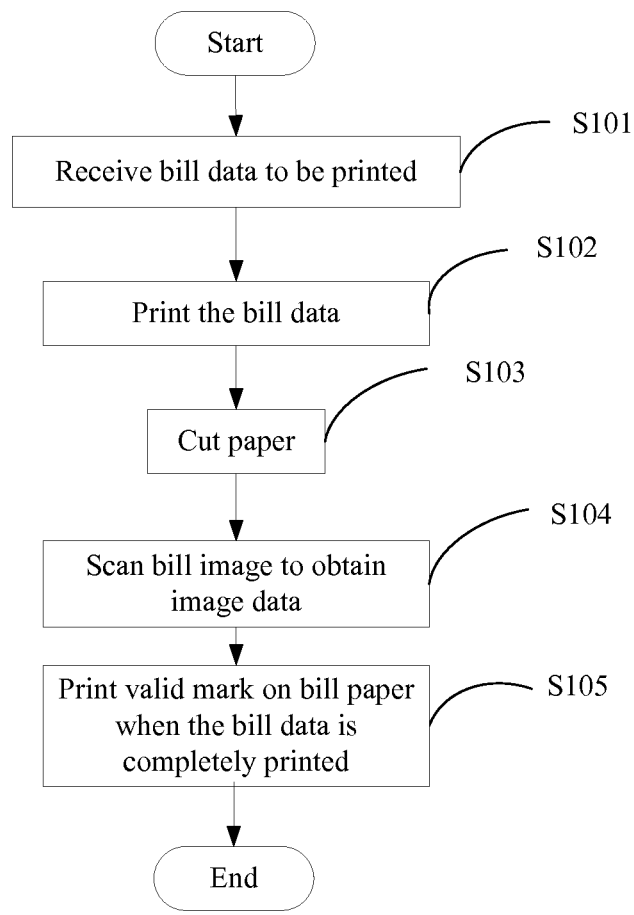
FIG. 3 shows a flowchart of a printing control method for the printer shown in FIG. 1.

FIG. 3 shows a flowchart of a printing control method for the printer shown in FIG. 1 of the invention; the printing control method comprises the following steps.

Step S101: Receive the ticket data to be printed;

for example, receive the ticket data to be printed which is sent by the host, wherein the ticket data means the data that a complete ticket includes.

Step S102: Print the ticket data;

for example, the first printing mechanism prints the ticket data on a surface of the printer paper.

Step S103: Cut paper;

after printing of the ticket data is completed, the printer control device performs paper cutting action according to a paper cutting command, and separates the printed ticket paper from the sheet roll.

Step S104: Scan the ticket image to obtain the image data;

the cut ticket paper passes the scanning mechanism, and then the image on surface of the ticket paper is acquired through the image acquiring module. For example, under the condition that it is the image data received by the printer, the controller locates the acquired scanned image, partitions the image according to the image content from the first position of the image, and finally judges whether the ticket is completely printed by comparing whether the contents of corresponding positions of each scanned image and the received printed data are consistent. When the acquired image data is consistent with the received ticket data to be printed, it is indicated that the ticket data is completely printed, otherwise, it is considered that the ticket data is printed incompletely.

Under the condition that it is the character data received by the printer, the image data can be transformed into the character data, and then the transformed character data is compared with the character data that the printer has received, for example, text or figure in the image is transformed into the character data by adopting the OCR recognition technology, or barcode in the image is transformed into the character data by adopting the barcode recognition technology. In the process of transforming the image data into the character data, for saving the processing time, preferably, the printer control device only transforms the image data in the preset key area into the character data, wherein the key area can be the area, where the images such as text, figure and barcode are, on the ticket paper. The realizing method can comprise: extract the image data in the key area according to the set coordinate; transform the image data into the character data when what the key area records is the text or figure; when what the key area records is the barcode, the number of bars and empty and the corresponding width and code system of the barcode in the scanned image can be extracted; transform the barcode into corresponding figure and character information according to the coding rule that the code system corresponds to, and compare them with the barcode data received by the printer. Note that, a barcode reader can also be set at corresponding position of the barcode on the ticket paper to acquire the barcode image.

Of course, the ticket data can be either image, or character and barcode; the image data acquired by scanning is respectively processed according to the above-mentioned ways, and is compared with corresponding part of the ticket data received by the printer, so as to judge whether the ticket data is complete.

The process of judging whether the ticket is completely printed is performed by comparing whether the acquired image data is consistent with the received ticket data. If the comparison result is yes, it is considered that the ticket data is completely printed, otherwise, it is considered that the ticket data is incompletely printed.

Step S105: Print valid mark when the ticket is completely printed.

When the ticket is completely printed, the second printing mechanism prints the valid mark representing that the ticket can be used normally on the ticket paper, wherein the mark can be barcode, serial number or character and so on.

The printing control method provided by the invention detects, after printing of each ticket is completed, whether the ticket content is printed completely by scanning the printed image, and prints the valid mark representing that the ticket can be used normally on the ticket paper under the condition that the ticket content is completely printed; by serving the valid mark as the basis that the ticket paper can be used normally, the printing control method can prevent the operator from opening the cover of printer to take ticket after printing the ticket, before or after scanning image, and before invalidating the ticket, which disables an invalid ticket processing mechanism to invalidate the invalid ticket, thereby avoiding the problem of using the invalid ticket as the valid ticket, which is caused by taking ticket maliciously.

Figure 4:
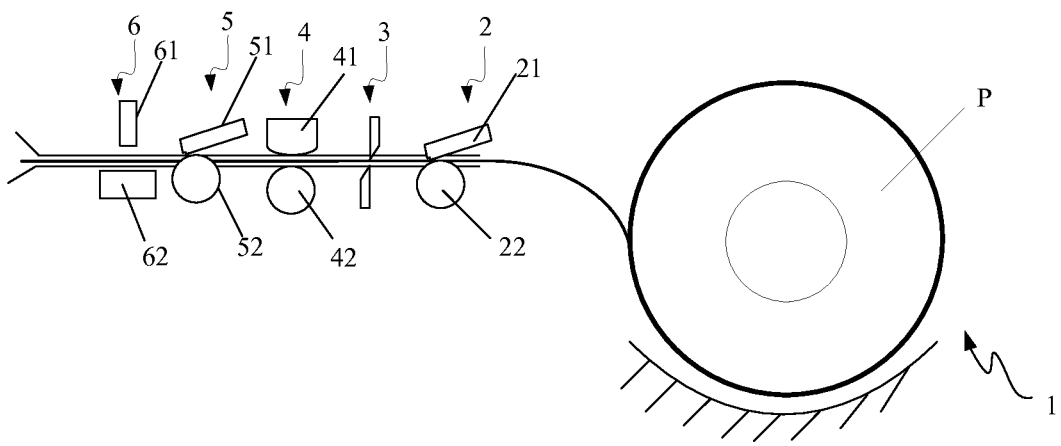
FIG. 4 shows a schematic diagram of a printer provided according to the second embodiment of the invention.

FIG. 4 shows a schematic diagram of a printer provided according to the second embodiment of the invention. The main difference between the printers provided by this embodiment and the first embodiment of the invention is that this printer further comprises an invalid ticket processing mechanism 6 which is used for recording an invalidating mark on the ticket paper with incompletely printed content; the invalid ticket processing mechanism can be either the printing mechanism, or the punching mechanism or stamping mechanism; the invalid ticket processing mechanism shown in the figure is the punching mechanism, comprising a punch 61 and a pad 62; the ticket is punched through the punch 61 to indicate that the ticket is invalidated and cannot be used.

It needs to note that when the invalid ticket processing mechanism 6 is the printing mechanism, the second printing mechanism can be directly used as the invalid ticket processing mechanism. When the ticket is completely printed, the second printing mechanism prints the valid mark representing that the ticket can be used normally on the ticket paper; when the ticket is incompletely printed, the second printing mechanism prints the invalidating mark on the ticket paper. In this way, marking of both the valid ticket and the invalid ticket can be realized by only using the second printing mechanism, which reduces the cost of printer.

Figure 5:
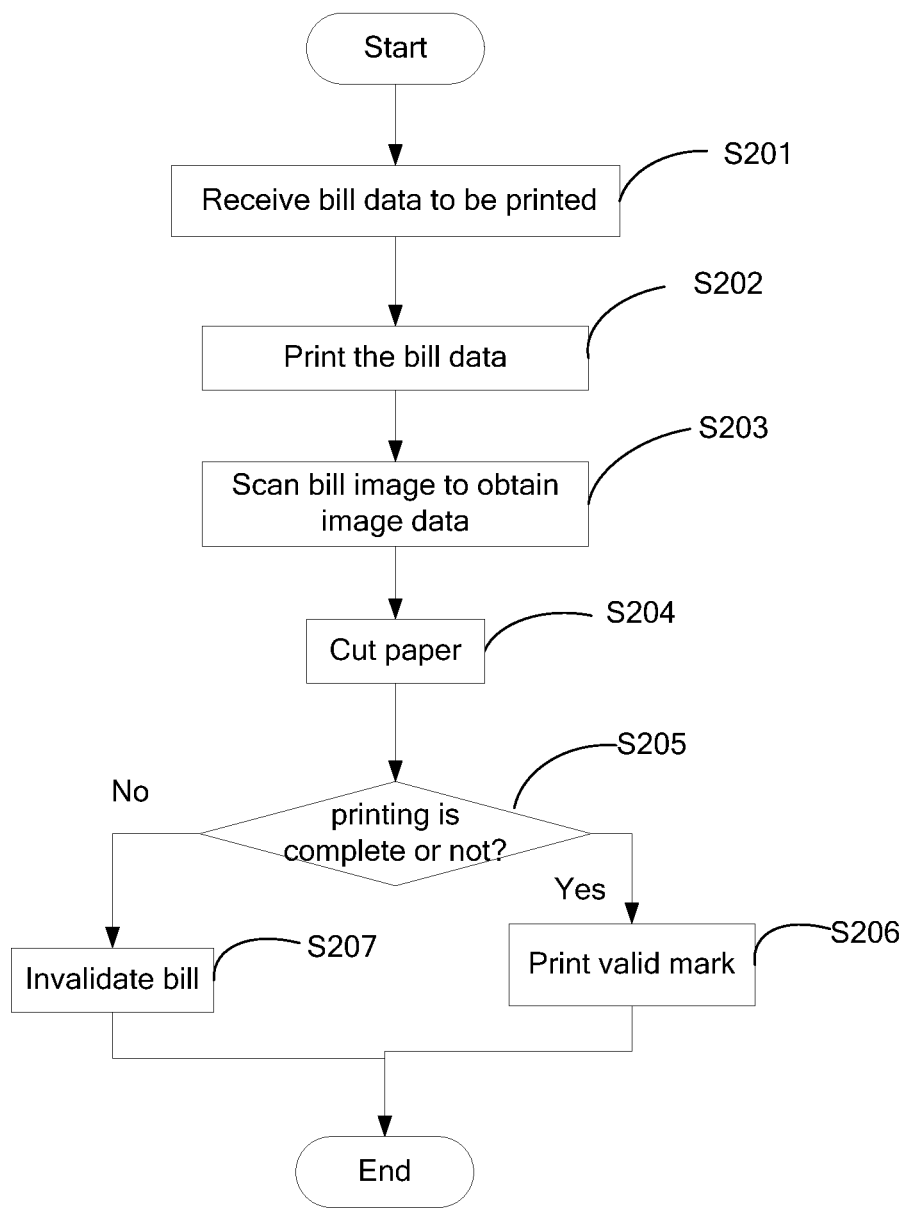
FIG. 5 shows a flowchart of a printing control method for the printer shown in FIG. 4.

FIG. 5 shows a flowchart of a printing control method for the printer shown according to FIG. 4; the printing control method comprises the steps below.

The steps from Step S201 to Step S204 are same as the steps from Step S101 to Step S104.

Step S205: Judge whether the ticket is completely printed, if yes, execute Step S206, otherwise, execute Step S207.

The process of judging whether the ticket is completely printed is performed by comparing whether the acquired image data is consistent with the received ticket data to be printed. When the acquired image data is consistent with the received ticket data to be printed, it is indicated that the ticket is completely printed, thus, the second printing mechanism prints the valid mark representing that the ticket can be used normally on the ticket paper; otherwise, it is indicated that the ticket is incompletely printed, and execute Step S207 to invalidate the ticket paper.

Step S206: Print valid mark.

The second printing mechanism prints the valid mark representing that the ticket can be used normally on the ticket paper, wherein the mark can be barcode, serial number or character and so on.

Step S207: Invalidate ticket.

The incompletely printed ticket paper is invalidated through the invalid ticket processing mechanism, for example, punching the ticket paper, or printing text or image for representing that the ticket paper cannot be used, such as the word "invalid", on the ticket paper, so as to prevent the incompletely printed ticket paper from being used by criminals. The specific action of the step is determined according to the type of the invalid ticket processing mechanism.

The printing control method and device provided by the invention perform predetermined process to the ticket under the condition that the ticket content is incompletely printed, and differentiate the valid ticket paper from the invalid ticket, which is more beneficial for avoiding the problem of using the invalid ticket as the valid ticket.

Figure 6:
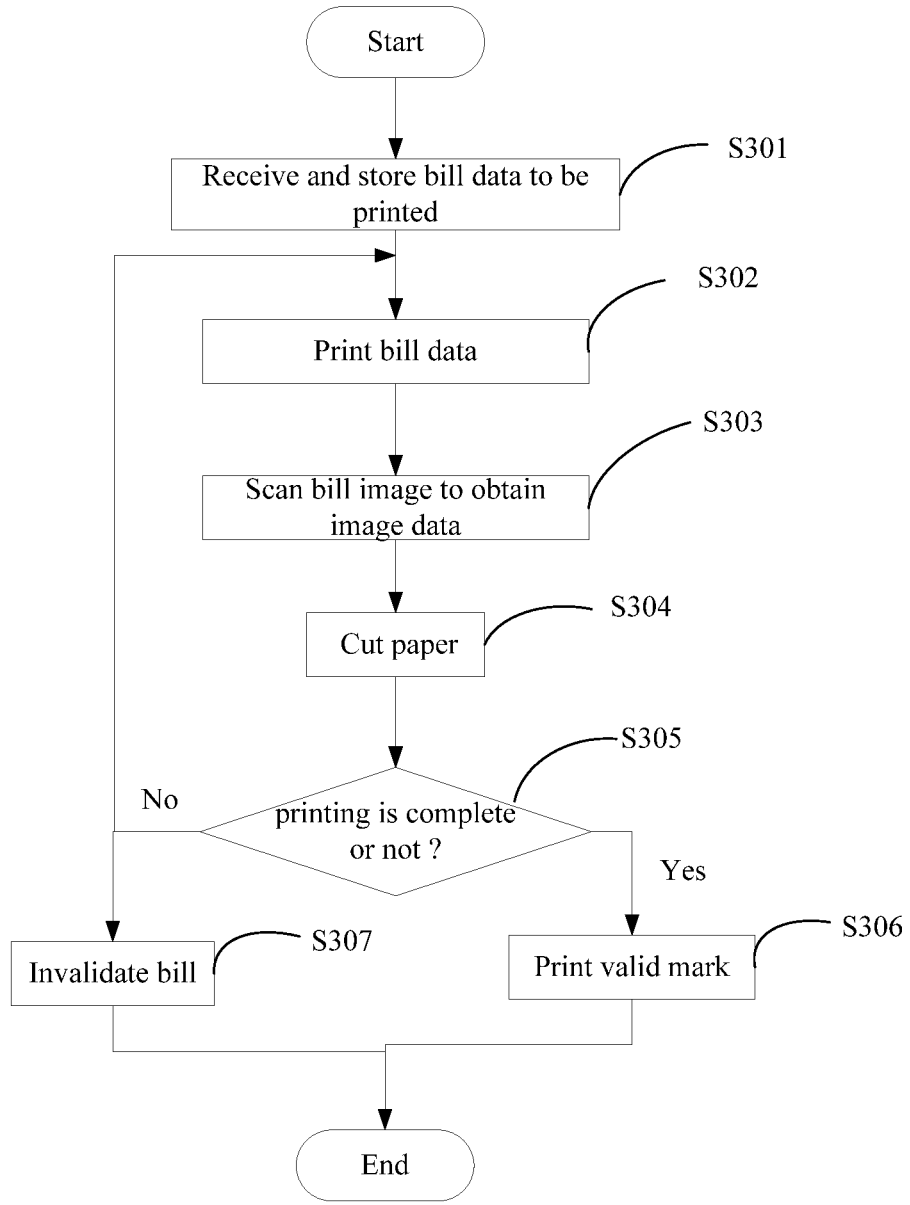
FIG. 6 shows a flowchart of another printing control method for the printer shown in FIG. 4.

FIG. 6 shows a flowchart of another printing control method for the printer shown according to FIG. 4.

Step S301: Receive and store the ticket data to be printed;

for example, receive the ticket data to be printed which is sent by the host, and store the data to the set storage.

Step S302: Print the ticket data;

for example, the first printing mechanism prints the ticket data to surface of the printer paper.

Step S303: Cut paper;

after printing of the ticket data is completed, the printer control device performs paper cutting action according to the paper cutting command, and separates the printed ticket paper from the sheet roll.

Step S304: Scan the ticket image to obtain the image data.

Step S305: Judge whether the ticket is completely printed, if so, execute Step S306, otherwise, execute Step S302 and Step S307.

Step S306: Print valid mark.

Step S307: Invalidate ticket.

The difference between this embodiment and the embodiment shown in FIG. 4 is that the ticket data is stored in the set storage while being received, so as to reprint the ticket under the condition that the printed ticket is incomplete, thereby reducing the operating steps of operator and ensuring ease of use of the printer.

Preferably, after it is judged that the ticket is completely printed in Step S305, the printer control device can delete the ticket data stored in the storage, so as to save the storage space.

Figure 7:
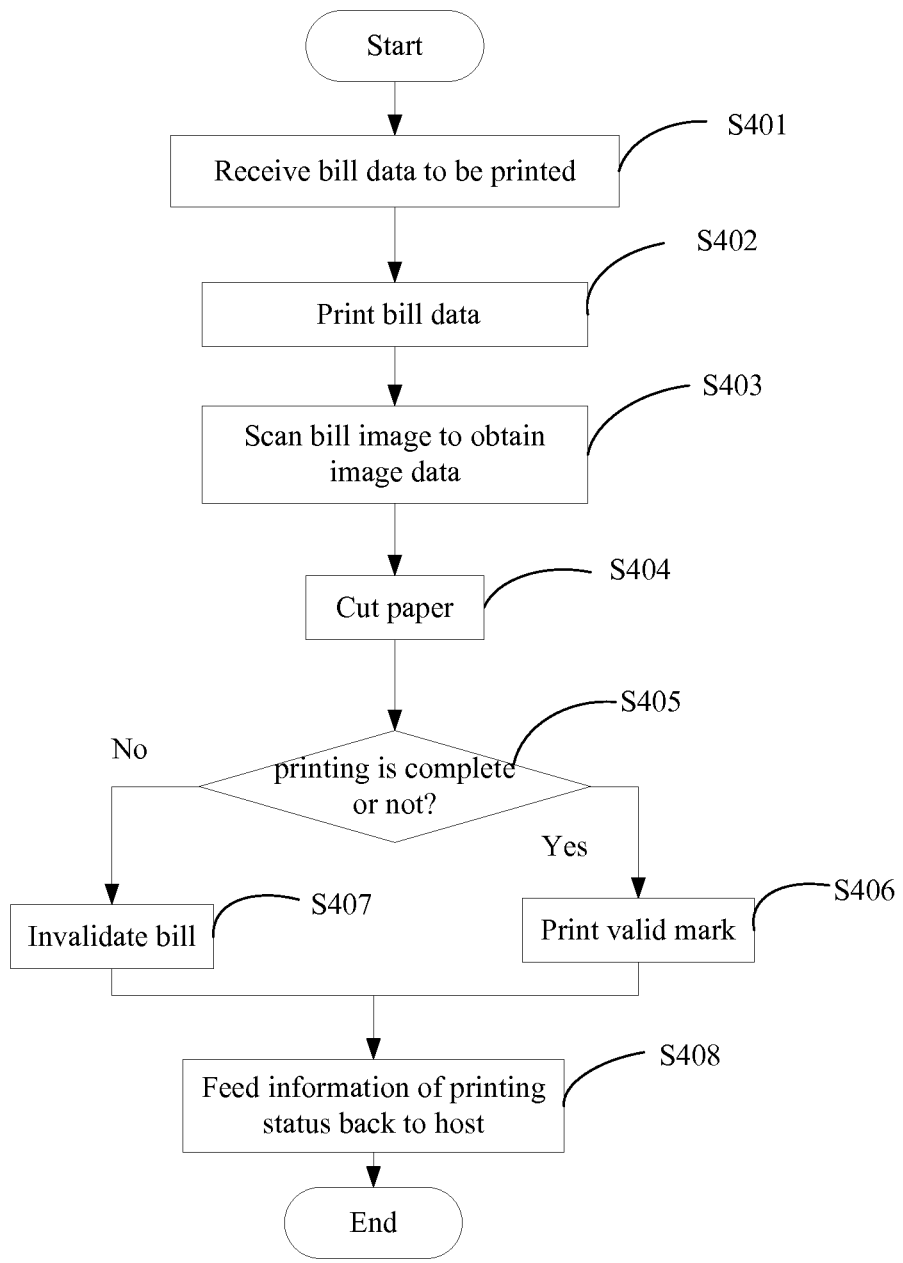
FIG. 7 shows a flowchart of a printing control method according to the second embodiment of the invention.

FIG. 7 shows a flowchart of a printing control method according to the second embodiment of the invention.

Step S401: Receive the ticket data to be printed;

for example, receive the ticket data to be printed which is sent by the host.

Step S402: Print the ticket data;

for example, the first printing mechanism prints the ticket data to surface of the printer paper.

Step S403: Cut paper;

after printing of the ticket data is completed, the printer control device performs paper cutting action according to the paper cutting command, and separates the printed ticket paper from the sheet roll.

Step S404: Scan the ticket image, and obtain the image data.

Step S405: Judge whether the ticket is completely printed, if yes, execute Step S406, otherwise, execute Step S407.

The process of judging whether the ticket is completely printed is performed by comparing whether the acquired image data is consistent with the received ticket data to be printed. When the acquired image data is consistent with the received ticket data to be printed, it is indicated that the ticket is completely printed, thus, the second printing mechanism prints the valid mark representing that the ticket can be used normally on the ticket paper; otherwise, it is indicated that the ticket is incompletely printed, and execute Step S407 to invalidate the ticket paper.

Step S406: Print valid mark;

for example, the second printing mechanism prints the valid mark representing that the ticket can be used normally on the ticket paper, wherein the mark can be barcode, serial number or character and so on.

Step S407: Invalidate ticket.

Step S408: Feed the ticket printing status back to the host.

After printing the valid mark on the ticket paper, the printer controller feeds the information that printing is completed back to the host; after performing invalidating process to the ticket paper, the printer controller feeds the information that printing is incomplete back to the host.

In this way, the host can judge whether printing of the ticket is completed according to the information of ticket printing status, which is fed back by the printer, so as to determine whether to register the ticket information to the ticket selling system and charge the buyer. Generally, when the host receives the information that printing is completed, the ticket information is registered to the ticket selling system, and the buyer is charged, otherwise, the ticket information is not registered, and the buyer is not charged.

The printing control method provided by the invention feeds the information that printing is completed back to the host only after printing of the valid mark is completed; the host registers the ticket information and charges the buyer according to the information, which can prevent undeserved charge of the invalid ticket and avoid dispute between the buyer and seller, caused by wrong charging.

Figure 8:
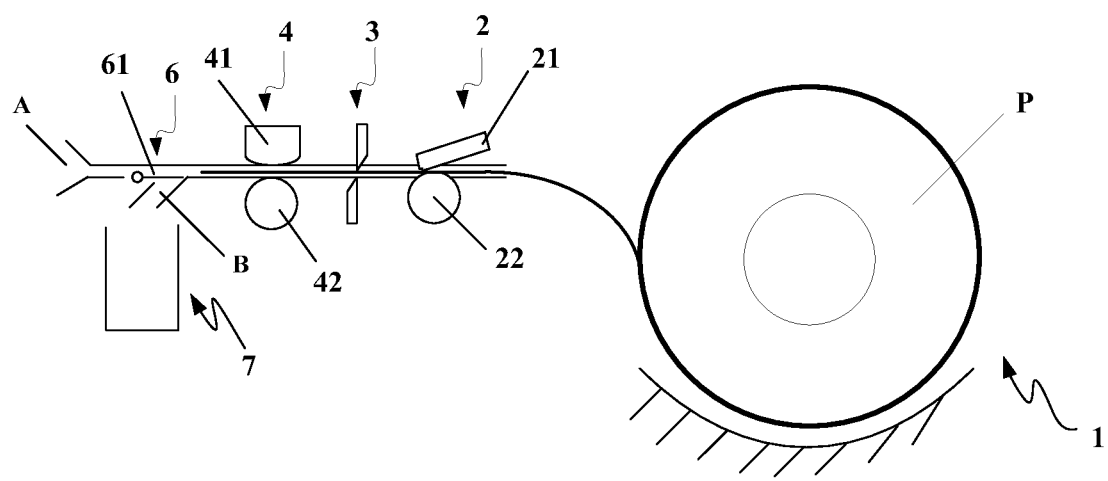
FIG. 8 shows a schematic diagram of a printer provided according to the third embodiment of the invention.

FIG. 8 shows a schematic diagram of a printer provided according to the third embodiment of the invention.

As shown in FIG. 8, the main difference between the printing controllers of the third embodiment and the above-mentioned embodiment is that a guide mechanism 6 and a recycling box 7 are set at downstream part of the scanning mechanism. The guide mechanism 6 is between the outlet A and the recycling opening B, and is used for guiding the printed ticket paper to output from the outlet A or the recycling opening B. The guide mechanism comprises a rotating plate 61 and a switching mechanism (not shown in the figure); the rotating plate 61 is hinged with the printer and connected with the switching mechanism. When the ticket content is completely printed, the rotating plate 61 closes the recycling opening B while opening the outlet A, to eject the completely printed ticket paper from the printer via the outlet A; when the ticket content is incompletely printed, the rotating plate 61 rotates around the hinge joint under drive of the switching mechanism, closes the outlet A and opens the recycling opening B, to make the incompletely printed ticket paper enter into the recycling box 7 via the recycling opening B. The switching mechanism of the guide mechanism can be electromagnet or cam mechanism.

Thus, it can be known from the printer provided by the third embodiment and shown in FIG. 8 that the incompletely printed ticket paper can be fed to the recycling box to store by the controlling the guide mechanism, when it is judged, through the scanning mechanism, that the ticket is incompletely printed, so as to prevent the incompletely printed ticket paper from being used by criminals.

The cutter mechanism 4 in the printer of the embodiment can also be set at downstream part of the scanning mechanism on the paper conveying passage; thus, the printed ticket paper is cut after being scanned. The printed ticket paper is ejected from the printer via the outlet A.

Figure 9:
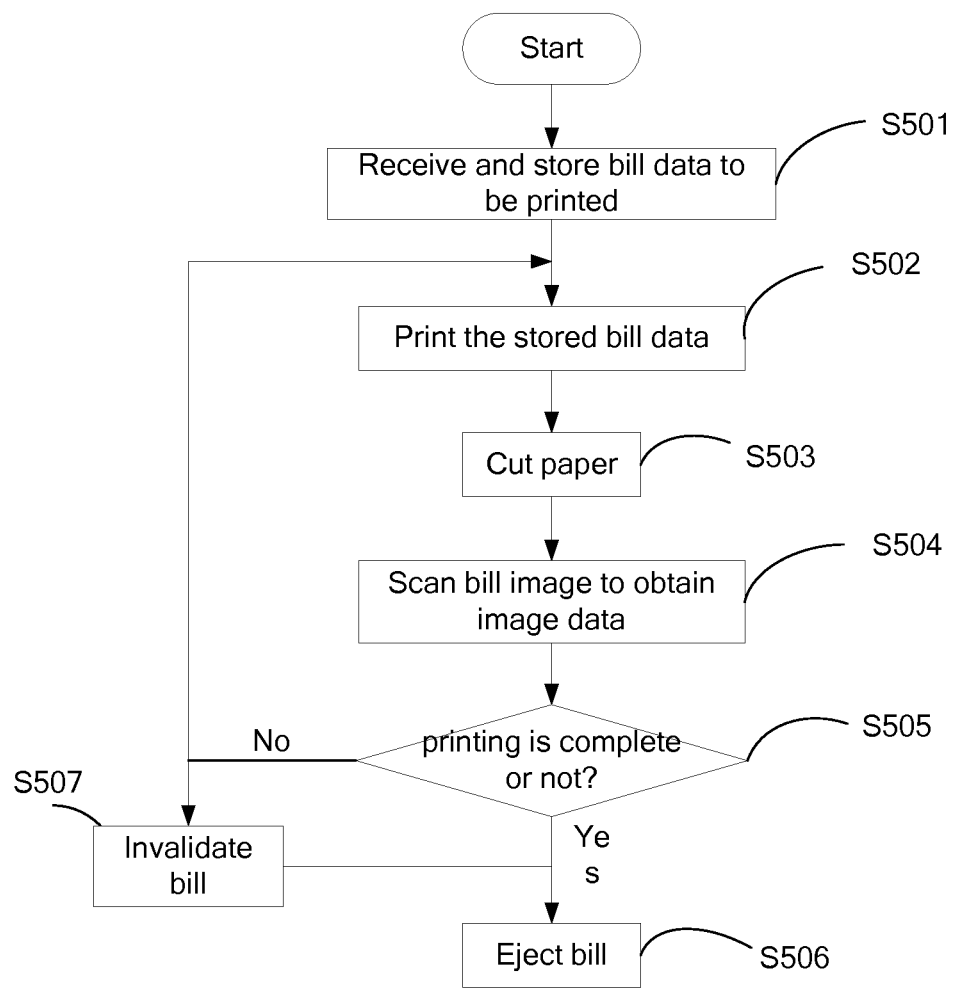
FIG. 9 shows a flowchart of a printing control method according to the third embodiment of the invention.

FIG. 9 shows a flowchart of a printing control method according to the third embodiment of the invention.

As shown in FIG. 9, the method comprises the following steps:

Step S501: Receive and store the ticket data to be printed;

for example, receive the ticket data to be printed which is sent by the host, and store the data to the set storage, wherein the ticket data means the data that a complete ticket includes.

Step S502: Print the stored ticket data;

the printing mechanism prints the stored ticket data to surface of the ticket paper.

Step S503: Cut paper;

after printing of the ticket data is completed, the printer control device performs paper cutting action according to the paper cutting command, and separates the printed ticket paper from the sheet roll.

Step S504: Scan the ticket image, and obtain the image data;

the cut ticket paper passes the scanning mechanism, and then the image on surface of the ticket paper is acquired through the image acquiring module; the image information is transformed into the character data by adopting the OCR recognition technology. In the process of transforming the image information into the character data, for saving processing time, the printing control system can only transform the image information in the preset key area into the character data, wherein the key area can be the area, where the images such as text, figure and barcode are, on the ticket paper.

Step S505: Judge whether the ticket is completely printed, if yes, execute Step S506, otherwise, execute Step S502, and eject the incompletely printed ticket paper from the printer.

The embodiment judges whether the ticket is completely printed by comparing whether the acquired image data is consistent with the received ticket data to be printed. When the acquired image data is consistent with the received ticket data to be printed, it is indicated that the ticket is completely printed, thus, the completely printed ticket paper is ejected via the outlet of the printer, otherwise, it is indicated that the ticket is incompletely printed, and execute Step S502 to reprint the ticket to be printed and eject the incompletely printed ticket paper from the printer.

When the image data transformed in Step S504 is only the one in the key area, the data compared with it can be the key data in the preset received ticket data to be printed.

In the embodiment, judging whether the ticket data is completely printed according to the image data can comprise: judge whether the ticket data is completely printed by directly comparing the image data acquired by scanning with the image data generated by the data received by the printer; or judge by transforming the image data acquired by scanning into the character data to compare with the received data.

Step S506: Eject ticket;

Eject the printed ticket paper via the outlet A of the printer.

After it is judged that the ticket is incompletely printed in Step S505, the information can be fed back to the host; the host software sends the prompt information that the current ticket is incompletely printed to the operator, and the operator determines whether it is needed to reprint the current ticket; after it is judged that the ticket is completely printed in Step S505, the printer control system can delete the ticket data stored in the storage, so as to save the storage space.

Step S507: Invalidate ticket.

When it is judged that the ticket is incompletely printed in Step S505, the incompletely printed ticket paper is invalidated by the invalid ticket processing mechanism while executing Step S502, for example, punching the ticket paper, or printing text or image for representing that the ticket paper cannot be used, such as the word "invalid", on the ticket paper, so as to prevent the incompletely printed ticket paper from being used by criminals. The specific action of the step is determined according to the type of the invalid ticket processing mechanism.

According to the embodiment of the invention, a printing system is further provided; the printing system comprises the host and the printer.

In the embodiment, the host is used for sending the ticket data; the printer is used for printing the received ticket data and extracting the printed ticket data. The printer can be any one of the above mentioned embodiments. The printing system can also be used for executing the printing control method mentioned in any above embodiment.

In the printing system, the printer and/or the host is further used for judging whether the ticket data is completely printed according to the printed ticket data, and the printer is further used for performing predetermined process according to the judgment result. That is, judging whether the ticket data is completely printed according to the printed ticket data can be performed either by the printer provided by the above embodiment of the printer independently or by the host independently; or the printer and the host judge whether the ticket data is completely printed together; when judging whether the ticket data is completely printed according to the printed ticket data is performed by the host independently, the printer directly sends the extracted printed ticket data to the host, and the host judges whether the ticket data is completely printed according to the received printed ticket data.

The step that the host judges whether the ticket data is completely printed according to the received printed ticket data can adopt the following method: the host compares the ticket data sent to the printer with the received ticket data (i.e.

the printed ticket data) from the printer to judge whether the ticket data is completely printed.

When judging whether the ticket data is completely printed by the printer and the host together, preferably, the following way can be adopted:

firstly, the printer judges whether the ticket data is completely printed according to the printed ticket data, wherein the printer sends the extracted printed ticket data to the host under the condition that it judges that the ticket data is incompletely printed; then, the host judges whether the ticket data is completely printed according to the printed ticket data. Judging by the method of the embodiment can improve the accuracy of judging.

The printer in the printing system comprises the first printing processing mechanism and/or the second processing mechanism.

The first processing mechanism is used for performing the first process under the condition that the ticket data is completely printed; the second processing mechanism is used for performing the second process under the condition that the ticket data is incompletely printed. The first processing mechanism and the second processing mechanism are the one mentioned in the above embodiment of the invention.

The printer, printing control method and system provided by the invention can detect the printing status of ticket data of each ticket in real time, thereby reprinting the incompletely printed ticket data and invalidating the incompletely printed ticket paper, which effectively avoids circulation of the ticket with incompletely printed content.

It can be seen from above description that, in the invention, the printed valid or complete ticket can be identified exactly and accurately, thereby avoiding the problem of using the invalid ticket as the valid ticket, which is caused by taking ticket maliciously, by detecting whether the ticket content is completely printed by scanning the printed image after completing printing of each ticket, printing the valid mark representing that the ticket can be used normally on the ticket paper under the condition that the ticket content is completely printed, and serving the valid mark as the basis that the ticket paper can be used normally. Furthermore, it is more beneficial for avoiding the problem of using the invalid ticket as the valid ticket by performing predetermined process to the ticket under the condition that the ticket content is incompletely printed, and differentiating the valid ticket paper from the invalid ticket. Furthermore, the information that printing is completed is fed back to the host only after printing of the valid mark is completed, and the host registers the ticket information and charges the buyer according to the information, which can prevent undeserved charge of the invalid ticket and avoid dispute between the buyer and seller, caused by wrong charging.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A printing control method, executed by a printer, comprising:
   receiving ticket data to be printed;
   printing the ticket data;
   judging whether the printed ticket data is complete; and
   performing predetermined process according to the judgment result, wherein, performing predetermined process according to the judgment result comprises: performing a first process under the condition that the ticket data is completely printed, and performing a second process under the condition that the ticket data is incompletely printed, wherein performing the second process under the condition that the ticket data is incompletely printed comprises: performing a second marking process on the incompletely printed ticket.

2. The printing control method according to claim 1, wherein, performing the first process under the condition that the ticket data is completely printed comprises:
   performing a first marking process on the completely printed ticket, and/or
   outputting a first prompting message, wherein the first prompting message is used for indicating that the ticket data is completely printed.

3. The printing control method according to claim 1, further comprising:
   sending a message that the printing is completed to a host under the condition that the ticket data is completely printed.

4. The printing control method according to claim 1, wherein, performing the second process under the condition that the ticket data is incompletely printed further comprises: performing one or more of the following processes:
   reprinting the ticket data;
   outputting a second prompting message, wherein the second prompting message is used for indicating that the ticket data is incompletely printed;
   recycling the incompletely printed ticket.

5. The printing control method according to claim 4, wherein, performing a second marking process on the incompletely printed ticket comprises:
   performing punching process to the incompletely printed ticket; and/or
   marking the ticket with text or image.

6. The printing control method according to claim 1, wherein,
   after receiving the ticket data to be printed, the method further comprises:
   storing the ticket data;
   under the condition that the ticket data is completely printed, the method further comprises:
   deleting the stored ticket data.

7. The printing control method according to claim 1, wherein, judging whether the printed ticket data is complete comprises:
   scanning the printed ticket data, and obtaining image data; and
   judging whether the ticket data is completely printed according to the image data.

8. The printing control method according to claim 7, wherein, scanning the printed ticket data to obtain the image data adopts the following way to scan:
   scanning image of a first preset area on the ticket.

9. The printing control method according to claim 7, wherein,
   after scanning the printed ticket data to obtain the image data, the method further comprises:
   transforming the image data into character data;
   judging whether the ticket data is completely printed according to the image data comprises:
   judging whether the ticket data is completely printed by comparing the character data with the ticket data.

10. The printing control method according to claim 9, wherein, transforming the image data into the character data comprises:

transforming the image data of a second preset area in the image data into the character data.

11. A printer, comprising:
a first printing mechanism, which is used for printing received ticket data;
an extracting mechanism, which is used for extracting the printed ticket data;
a control mechanism, which is used for judging whether the ticket data is completely printed according to the printed ticket data; and
a processing mechanism, which is used for performing predetermined process according to a judgement result,
wherein the processing mechanism comprises:
a first processing mechanism, which is used for performing a first process under the condition that the ticket data is completely printed; and
a second processing mechanism, which is used for performing a second process under the condition that the ticket data is incompletely printed,
wherein the second processing mechanism comprises: a second marking mechanism, which is used for marking the incompletely printed ticket, wherein the mark is used for indicating that the ticket data is incompletely printed.

12. The printer according to claim 11, wherein the first processing mechanism comprises:
a first marking mechanism, which is used for marking the completely printed ticket, wherein the mark is used for indicating that the ticket data is completely printed; and/or
a first prompting mechanism, which is used for outputting a first prompting message, wherein the first prompting message is used for indicating that the ticket data is completely printed.

13. The printer according to claim 12, wherein the first marking mechanism comprises:
a first printing mechanism, which is used for printing mark information on the completely printed ticket.

14. The printer according to claim 11, wherein the second processing mechanism further comprises one or more of the following:
a second prompting mechanism, which is used for outputting a second prompting message, wherein the second prompting message is used for indicating that the ticket data is incompletely printed; and
a recycling mechanism, which is used for recycling the incompletely printed ticket.

15. The printer according to claim 14, wherein the second marking mechanism comprises:
a first punching mechanism, which is used for performing punching process to the incompletely printed ticket; and/or
a first text or image marking mechanism, which is used for making the ticket with text or image.

16. The printer according to claim 11, wherein, under the condition that the printer comprises the first processing mechanism and the second processing mechanism, the first processing mechanism and the second processing mechanism are the same mechanism.

17. The printer according to claim 11, wherein the extracting mechanism comprises:
a scanning mechanism, which is used for scanning the printed ticket data to obtain the image data,
wherein, the control mechanism is used for judging whether the ticket data is completely printed according to the image data.

18. The printer according to claim 11, further comprising:
a cutter mechanism, which is in a paper conveying passage and used for cutting the printed ticket paper;
a first outlet, which is used for outputting the completely printed ticket; and
a second outlet, which is used for outputting the incompletely printed ticket.

19. A printing system, comprising:
a host, which is used for sending ticket data; and
a printer, which is used for printing received ticket data, and extracting printed ticket data,
the printer and/or the host is further used for judging whether the ticket data is completely printed according to the printed ticket data, wherein the printer is further used for performing predetermined process according to the judgement result,
wherein the printer comprises:
a first processing mechanism, which is used for performing a first process under the condition that the ticket data is completely printed; and
a second processing mechanism, which is used for performing a second process under the condition that the ticket data is incompletely printed, wherein performing the second process under the condition that the ticket data is incompletely printed comprises: performing a second marking process on the incompletely printed ticket.

20. The printing system according to claim 19, wherein the printer is used for judging whether the ticket data is completely printed according to the printed ticket data, firstly; then the host is used for judging whether the ticket data is completely printed according to the printed ticket data, under the condition that the printer judges the ticket data is incompletely printed.

* * * * *